United States Patent
Sievänen et al.

(10) Patent No.: US 7,699,712 B1
(45) Date of Patent: Apr. 20, 2010

(54) CONSTRUCTION ELEMENT FOR A BOWLING LANE AND A BOWLING LANE

(75) Inventors: Mikko Sievänen, Kämmenniemi (FI); Joni Hietala, Tampere (FI); Pentti Järvelä, Tampere (FI)

(73) Assignee: System-300 Group Oy, Tampere (FI)

( * ) Notice: Subject to any disclaimer, the term of this patent is extended or adjusted under 35 U.S.C. 154(b) by 1163 days.

(21) Appl. No.: 09/868,244

(22) PCT Filed: Dec. 15, 1999

(86) PCT No.: PCT/FI99/01034

§ 371 (c)(1),
(2), (4) Date: Jul. 10, 2001

(87) PCT Pub. No.: WO03/37151

PCT Pub. Date: Jun. 29, 2000

(30) Foreign Application Priority Data

Dec. 18, 1998 (FI) .................................. 982743

(51) Int. Cl.
*A63D 1/04* (2006.01)

(52) U.S. Cl. ...................... 473/115; 473/117

(58) Field of Classification Search ............... 473/115, 473/117; 428/56, 203, 537, 172, 178; 52/309.9
See application file for complete search history.

(56) References Cited

U.S. PATENT DOCUMENTS

| | | | |
|---|---|---|---|
| 2,722,735 A * | 11/1955 | Beamish | |
| 3,070,195 A * | 12/1962 | Wilson | |
| 4,205,842 A | 6/1980 | Murrey, Sr. | |
| 4,205,843 A | 6/1980 | Murrey, Sr. | |
| 4,231,573 A | 11/1980 | Kelly | |
| 4,307,883 A | 12/1981 | Kelly | |
| 4,311,177 A | 1/1982 | Kelly | |
| 4,320,898 A * | 3/1982 | Brunst et al. | |
| 4,337,290 A * | 6/1982 | Kelly et al. | 428/201 |
| 4,379,553 A | 4/1983 | Kelly | |
| 4,456,253 A | 6/1984 | Kelly | |
| 4,557,961 A * | 12/1985 | Gorges | |
| 4,599,124 A | 7/1986 | Kelly et al. | |

(Continued)

FOREIGN PATENT DOCUMENTS

GB 1328562 8/1973

(Continued)

OTHER PUBLICATIONS

Honeycomb Productys Corportation, http://www.honeycombproducts.com/smcell.htm, pp. 1-4, Dec. 1998.*

(Continued)

*Primary Examiner*—William M Pierce
(74) *Attorney, Agent, or Firm*—Venable LLP; Eric J. Franklin

(57) ABSTRACT

A construction element (4) for a bowling lane is intended as a surface board of the bowling lane and it comprises at least one laminate layer (1), a board layer (2) and a supporting structure layer (3). The supporting structure layer (3) is a cellular structure of a honeycomb shape.

3 Claims, 2 Drawing Sheets

U.S. PATENT DOCUMENTS

| | | | |
|---|---|---|---|
| 4,689,257 A * | 8/1987 | Baum | |
| 4,756,943 A * | 7/1988 | Koletzko | |
| 5,006,391 A * | 4/1991 | Biersach | |
| 5,106,668 A * | 4/1992 | Turner et al. | 428/116 |
| 5,349,893 A * | 9/1994 | Dunn | 89/36.05 |
| 5,373,674 A * | 12/1994 | Winter, IV | |
| 5,549,516 A * | 8/1996 | Heddon | 473/115 |
| 5,612,117 A * | 3/1997 | Belanger et al. | |
| 5,738,924 A | 4/1998 | Sing | |
| 5,789,060 A * | 8/1998 | Marshall et al. | |
| 6,183,837 B1 * | 2/2001 | Kim | |
| 6,287,664 B1 * | 9/2001 | Pratt | |

FOREIGN PATENT DOCUMENTS

| | | |
|---|---|---|
| GB | 1420009 | 1/1976 |
| GB | 2035895 | 6/1980 |
| GB | 2197820 | 6/1988 |

OTHER PUBLICATIONS http://www.panelteccorp.com, Jun. 2001.* http://www.bellcomb.com, Jan. 2000.*

Materials Science and Engineering An Introduction, by William D. Callister, Jr., John Wiley and Sons, Inc.. New York, 1997 pp. 541 and 542.*

* cited by examiner

CONSTRUCTION ELEMENT FOR A BOWLING LANE AND A BOWLING LANE

The present invention relates to a bowling lane and a construction element of the same. Said construction element comprises a laminate layer, a board layer as well as a supporting structure layer.

Typically, bowling lanes are composed of a substructure and boards attached thereto or of wood strips attached to each other. The substructure is usually a trussed construction made of wood beams. Typically, there are several boards placed on top of each other so that the required strength properties are attained. If the surface material of the lane is synthetic material instead of wood, a laminate layer is typically attached on the outer surface of the topmost board. The boards are mounted on the substructure by means of screws in such a manner that in the direction of the lane the difference in levels of the joints between the elements may be 0.635 mm (1/40") at the most.

The bowling lane is composed of an approach, a ball track and a pin deck. Different parts of the bowling lane require different qualities, which have to be taken into account when the lane is designed. By the approach, the lane has to endure e.g. the weight of the bowler, and as far as the ball track and the pin deck are concerned, impact resistance and the friction on the surface of the lane are important features.

Known bowling lanes and construction elements of bowling lanes are discussed for example in patents of General Electric Co U.S. Pat. No. 4,231,573, U.S. Pat. No. 4,307,883, U.S. Pat. No. 4,320,898, U.S. Pat. No. 4,337,290, U.S. Pat. No. 4,379,553, U.S. Pat. No. 4,456,253 and U.S. Pat. No. 4,599,124 as well as U.S. Pat. No. 4,205,842. The applicant of this patent also manufactures bowling lanes by applying a particular method.

The U.S. Pat. No. 4,231,573, U.S. Pat. No. 4,307,883, U.S. Pat. No. 4,337,290, U.S. Pat. No. 4,379,553, U.S. Pat. No. 4,456,253 and U.S. Pat. No. 4,599,124 all introduce a similar construction in which the laminate is fixed on a bottom plate, whereby the topmost construction element of the bowling lane is formed. The material of the laminates and/or bottom plates varies to some extent, for example in the U.S. Pat. No. 4,379,553 the laminate is fireproof and in the U.S. Pat. No. 4,231,573 concrete is suggested as a bottom plate. Typically the bottom plates used are wood-based boards. The U.S. Pat. No. 4,456,253 discloses a two-sided construction element which can be turned around when the surface which is used is worn out.

The U.S. Pat. No. 4,320,898 discloses a somewhat different solution for a construction element of a bowling lane. The inner part of the construction element is composed of wood strips which are attached to each other by means of glue or nails. The humidity of the wood strips in the inner part is standardized and the inner part is closed from the environment by means of a laminate attached on the outer surfaces as well as a moisture barrier attached to the corners. The construction element can be attached directly on top of the substructure.

The U.S. Pat. No. 4,205,842 discloses a bowling lane solution in which the ball track is formed of fibre board on top of which a laminate is attached. On the approach lane as well as on the pin deck the laminate is attached on rigid boards which can be made of e.g. aluminum.

At present, the applicant of this patent manufactures bowling lanes in such a way that two superimposed MDF boards are attached on top of a trussed construction made of wood beams, as well as a high pressure laminate board which is made of paper impregnated with resin. The term MDF board refers to a board in which the wood-based construction parts, for example the fibres and wood chips, are treated with an adhesive medium, thus forming a mat, whereafter it is pressed in the form of boards by means of pressure and heat.

The MDF boards are placed on top of the truss in such a way that the joint of the boards in the first board layer is situated in a different location than the joint of the boards in the second boards layer. Thus, weak spots do not occur in the construction.

The problems of known construction elements of bowling lanes include complexity of installation, heavy elements, relatively high price of the elements as well as poor sales value due to the complexity of the installation/disassembly. The construction of the bowling lanes is not optimized either, but known bowling lane constructions comprise components which are substantially too durable with respect to the target of use, which components, however, easily react to changes in climate conditions. On the other hand, the different parts of the lane require different qualities, and thus, a completely equal lane construction is not the best possible one all over the lane.

The purpose of the bowling lane element according to the invention is to avoid the problems of known bowling lane constructions. The bowling lane element according to the invention will be characterized in what will be presented in the characterizing part of the appended claim 1.

The bowling lane element according to the invention is light, cheap and it can be easily disassembled, assembled and transferred, wherein it also possesses resale value. It endures humidity and temperature changes better than known bowling lane constructions.

By using said elements, it is also possible to build bowling lanes for temporary use, e.g. for happenings which last only a fixed period of time. The elements can also be constructed in such a way that they can be used either side facing upward, and thus, the elements can be turned when the other side has worn out and become unusable.

Superimposed boards are not necessary, but the bowling lane element can be fixed directly on top of the substructure. The substructure of the lane element can be made lighter in weight, because the elements are more rigid and they exert a substantially smaller stress on the substructure than known solutions. Similarly, by altering the thickness of different layers of the bowling lane element while keeping the overall thickness of the element constant, a suitable construction in view of the requirements of different lane sections is attained.

In the following, the bowling lane and the bowling lane element according to the invention will be described in more detail by means of an example and with reference to the appended drawings.

A bowling lane with all its devices is quite a complex construction, which, in addition to the lane, includes a ball return system and a pin setting apparatus. This example, however, only discusses the structure of the actual bowling lane.

Figure 1:
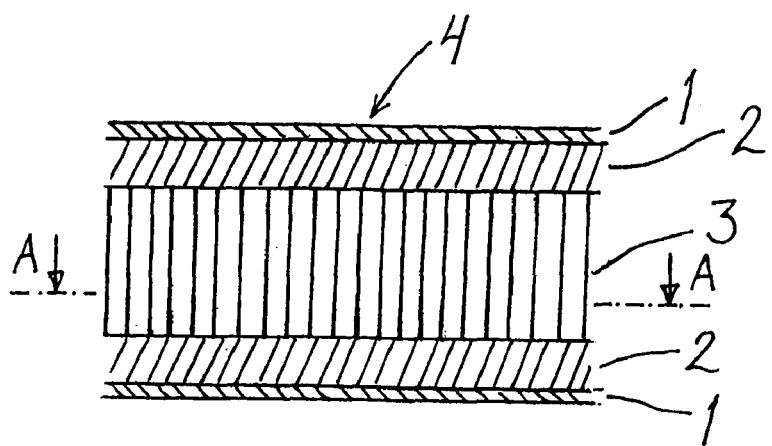
FIG. 1 shows the structure of a bowling lane element.

A bowling lane element according to FIG. 1, to which reference is made in its entirety by reference numeral 4, is formed of a laminate layer 1, a board layer 2, and a supporting structure layer 3. In the example, the laminate layer 1 is a high pressure laminate, the board layer 2 is a wood-based board and the supporting structure layer 3 is a cellular board.

The high pressure laminate 1 constitutes the actual surface structure, as it is an impact resistant and sufficiently hard and stiff layer with good friction and abrasion properties. Underneath the laminate 1, a wood-based board 2, preferably made of high-density chipboard, constitutes a layer which endures impact stress. The density of this chipboard is advantageously over 1000 kg/m$^3$. The cellular board 3 has a high specific stiffness, and it endures well the changes in climatic conditions (heat, humidity). It is also a light-weighted structure, which substantially decreases the mass of the lane element.

The laminate 1 is made of multilayer paper impregnated with resin, and it is fixed on the wood-based board 2 which is 5 to 30 mm thick. The thickness of the laminate varies in different sections of the lane, for example by the pin deck the laminate 1 is thicker, whereas the wood-based board 2 and/or the cellular board 3 has to be thinner so that the overall thickness of the lane element 4 equals the thickness of the other lane elements, because otherwise the installation of the elements becomes unreasonably difficult. When the bowling lane is dimensioned, the starting point is that when the element is loaded with a mass of 300 kg, it must not bend more than 1.016 mm (4/100"), if a span length of 1 m is used in the substructure.

The laminate 1, the wood-based board 2 and the cellular board 3 are attached to each other by means of an adhesive medium. The adhesive medium, which has to be high-modulus and very durable, can be in a form of a solution, paste or film.

Figure 2:
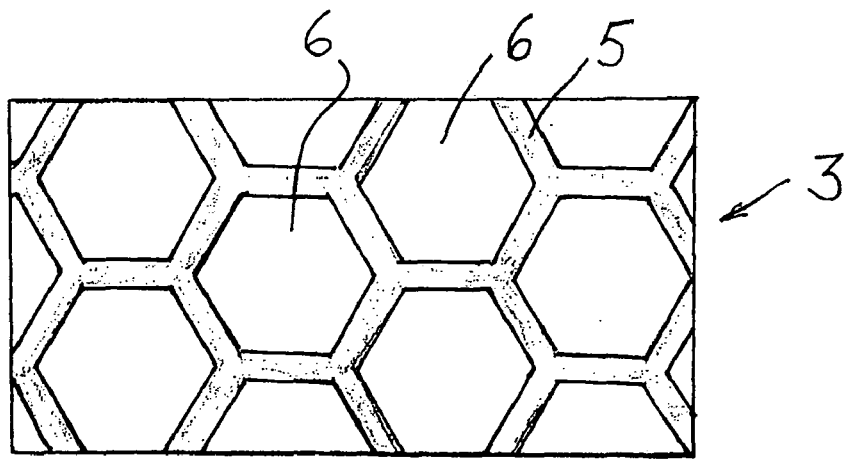
FIG. 2 shows the structure of a cellular board in a cross-section A-A of FIG. 1.

According to FIG. 2, the cellular board 3 is composed of a wall 5 which separates cells 6 which are attached to each other wall to wall. The wall 5 is made of aluminium. The thickness of the cellular board varies between 10 and 30 mm, and the diameter of the cells can vary in the area of 5 to 15 mm. Standard dimensions are 6.35 mm (¼") or 9.525 mm (⅜"). In the bowling lane element 4 according to this example, the cellular board contains cells which are hexagonal, so-called honeycombs. By means of the honeycomb structure it is possible to attain substantially equal strength properties irrespective of the direction.

The bowling lane element 4 can be constructed as a mirror image in such a way that on both sides of the cellular board 3 there is a wood-based board 2, on the outer surface of which there is a laminate 1. By means of such a structure a substantially strainless construction is attained which remains in its original shape. At the same time the advantage is attained that the board can be turned, if necessary. The sides of the bowling lane element 4 can be closed so that they become air-tight and the changes in humidity and temperature do not affect the bowling lane element 4.

Figure 3:
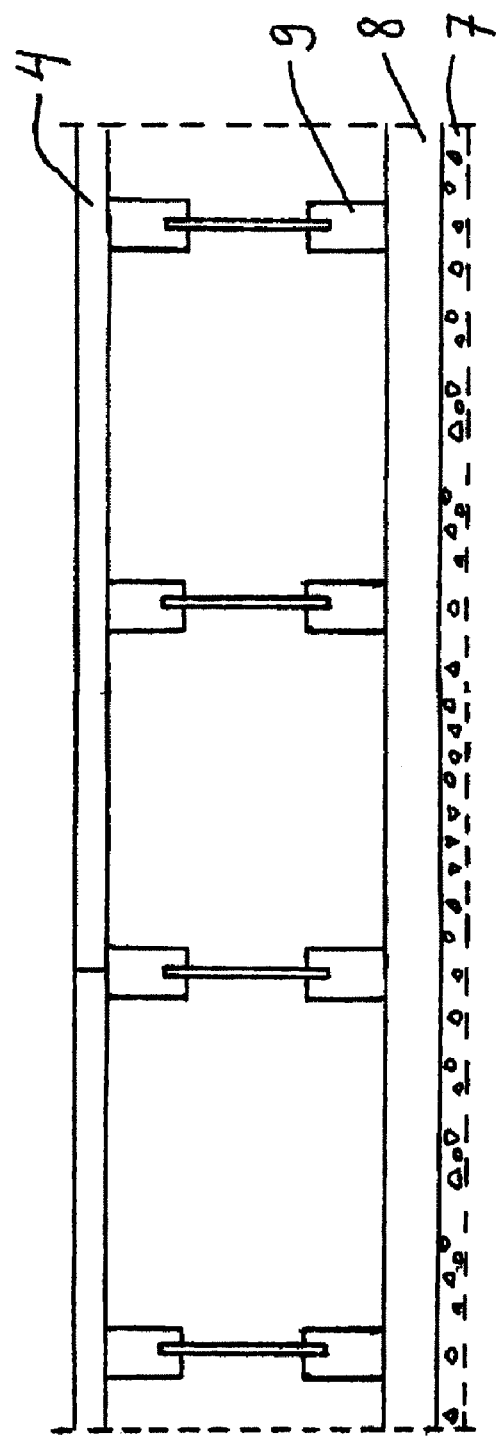
FIG. 3 shows a side-view of the structure of the bowling lane.

FIG. 3 shows a bowling lane, which is installed on a concrete floor 7. The substructure of the lane is made of wood beams 8 of 45×95 mm, on top of which beams 9 are placed at regular intervals, the beams being I-beams made of wood in this case. The bowling lane element 4 is fixed to the beams 9. Adjacent bowling lane elements 4 are fixed on top of the substructure without the underlying boards to form a single uniform board layer.

When compared to a bowling lane made of laminate and MDF boards, the bowling lane constructed of construction elements 4 according to the invention has a considerably smaller mass. If the construction element 4 contains an aluminium cellular board, with a thickness of 25.4 mm (1") and the diameter of the cells is 6.35 mm (¼"), and a wood-based board (thickness 10 mm) made of high-density chipboard on both sides of the cellular board, as well as a laminate board (thickness 3.175 mm), the mass of the element of 3.3 m$^2$ becomes approximately 100 kg. A corresponding surface area constructed of two MDF boards and a laminate board weighs 195 kg.

The cellular structure also makes it possible e.g. to add a substance in the cell. One alternative is to place polyurethane in the cells to improve sound insulation.

It is obvious for anyone skilled in the art that the invention is not restricted solely to the above example, but it can vary within the scope of the claims hereinbelow. The cross-section of the cells in the cellular board can, for example, have the shape a square or an octagon. The cellular board can also be made of a material other than aluminium. It is also possible that several separate pieces with a cellular structure constitute the supporting structure layer. It is typical for all of these that the walls 5 of the cellular structure are substantially transverse to the plane of the board layers, i.e. they stand erect between the horizontal board layers 3. As a substructure of the bowling lane it is possible to use a structure other than the above-presented beam structure.

The invention claimed is:

1. A sectional bowling lane, comprising:
    a substructure comprising beams; and
    a plurality of construction elements arranged on top of the substructure, each construction element comprising at least one supporting structure layer comprising a cellular board including a plurality of cells each having a longitudinal axis extending in a direction perpendicular to the cellular board, an impact stress enduring board layer attached to opposite sides of the supporting structure layer, and a bowling surface comprising at least one impact-resistant laminate layer attached to the board layer on at least one side of the supporting structure layer,
    wherein the construction elements are operatively connected to each other.

2. The bowling lane according to claim 1, wherein the layers of the construction elements of the bowling lane have a different thickness in different sections of the bowling lane such that an overall thickness of the construction elements remains constant on the entire lane.

3. A construction element for a sectional bowling lane, the construction element comprising:
    at least one supporting structure layer comprising a cellular board including a plurality of cells each having a longitudinal axis extending in a direction perpendicular to the cellular board;
    an impact stress enduring board layer attached to opposite sides of the supporting structure layer; and
    a bowling surface comprising at least one impact resistant laminate layer attached to the board layer on at least one side of the supporting structure layer;
    wherein the construction element is configured to be operatively connectable to at least one other construction element and wherein the laminate layer comprises at least one resin impregnated paper layer.

* * * * *